United States Patent [19]
Mueller et al.

[11] Patent Number: 5,155,802
[45] Date of Patent: Oct. 13, 1992

[54] GENERAL PURPOSE NEURAL COMPUTER

[75] Inventors: Paul H. Mueller, King of Prussia; Jan Van Der Spiegel, Philadelphia, both of Pa.

[73] Assignee: Trustees of the Univ. of Penna., Philadelphia, Pa.

[21] Appl. No.: 502,053

[22] Filed: Mar. 30, 1990

Related U.S. Application Data

[63] Continuation-in-part of Ser. No. 428,455, Oct. 10, 1989, abandoned, which is a continuation of Ser. No. 128,321, Dec. 3, 1987, abandoned.

[51] Int. Cl.$^5$ ............................................. G06F 15/18
[52] U.S. Cl. ........................................ 395/24; 395/11
[58] Field of Search .................... 364/513; 395/26, 27, 395/24, 11

[56] References Cited

PUBLICATIONS

Design of parallel hardware neural network systems from custom analog VLSI "Building Block" chips; IJCNN; Jun. 18-22 1989, vol. 2; pp. II 183-II 190; Eberhardt et al.
Architectures and Applications of the connection Machine; Tucker et al; IEEE Computer; Aug. 1988; pp. 26-38.

*Primary Examiner*—MacDonald Allen R.
*Attorney, Agent, or Firm*—Woodcock Washburn Kurtz Mackiewicz & Norris

[57] ABSTRACT

A general purpose programmable neural computer which parallel processes analog data. The neural computer comprises neural elements for outputting an analog signal in response to at least one input signal, synaptic circuits interfaced with the neural elements for modifying gains of the neural elements, and switching circuits interfaced with the synaptic circuits and the neural circuits for routing signals between the synapse circuits and the neural circuits and for modifying the synaptic time constants, thereby changing connection architecture of the general purpose analog computer as desired. In this manner, the neural computer of the invention can be programmed to learn different confirurations as well as different synaptic values.

8 Claims, 7 Drawing Sheets

GENERAL PURPOSE NEURAL COMPUTER

CROSS-REFERENCE TO RELATED APPLICATIONS

This application is a continuation-in-part of application Ser. No. 428,455, filed on Oct. 30, 1989, now abandoned, which is a continuation of application Ser. No. 128,321, filed on Dec. 3, 1987, now abandoned.

FIELD OF THE INVENTION

This invention relates to analog processing of data. More specifically, this invention relates to the implementation of an artificial neural network which is useful for learning an environment and for analog processing of analog signals inputs to the neural network.

BACKGROUND OF THE INVENTION

Pattern recognition has been accomplished in various ways in the prior art. One of the best known methods of pattern recognition is typified by a simple radar system wherein a beam of electromagnetic energy illuminates a target and is backscattered to a receiver set which is coupled to a computer that analyzes the back-scattered signal and forms an image of the target. Similarly, sonar systems accomplish the same result with acoustical type signals.

Regardless of the transmission and receiving apparatus used in these systems, a multi-purpose, digital computer is continually utilized to perform complex calculations to obtain an output which identifies the input signal. The types of computers used in the prior art to perform such calculations have been exclusively sequential machines that require sophisticated programming to effectively perform pattern recognition algorithms such as Fourier transforms, fast Fourier transforms and similar types of algorithms known to those with ordinary skill in the art.

A major drawback which exists with the use of digital, sequential computers in pattern recognition systems is the inherent limitation of these computers to perform their function only in a strictly sequential fashion. It is known that sequential, digital computers perform one step of a process or algorithm over each machine cycle. In this manner, successive iterations are repeated over a large number of computer machine cycles of a complex algorithm in order to perform pattern recognition and other computer functions.

Depending upon the complexity of the algorithm, the digital computer must perform enormous numbers of machine cycles to form the complete solution of a complex algorithm. For example, when higher order differential equations must be solved simultaneously or when a large number of differential equations must be solved either simultaneously or sequentially, the number of machine cycles required to solve the equations increases drastically. With these drastic increases in machine cycles comes an increased time period for the digital, sequential computer to perform a complete analysis of incoming data. Those skilled in the art will appreciate that complete and useful pattern recognition with such digital computers can take hours or even days. Thus, the use of digital computers generally does not allow pattern recognition in "real-time."

There is therefore a long-felt need in the computer art for a machine which can drastically reduce the time required to perform algorithmic tasks and to provide methods and systems for fast and efficient pattern recognition. Some form of parallel processing of incoming signals could perform this function, also, the use of a parallel processor or a machine capable of inherent parallelism could allow pattern recognition of a complex signal in real-time.

An additional problem which has existed in the computer and pattern recognition arts arises from the requirement that signals be resolved into digital components before they may be processed by a sequential, digital computer. This requires that all incoming signals be first "digitized" by an "analog to digital" component of the pattern recognition system before the digital computer can begin processing the signal with its particular pattern recognition algorithm. This places many burdens on prior art pattern recognition systems in that it requires expensive hardware to implement analog to digital conversion and increases the overall processing time of such systems by requiring the analog to digital conversion step. Thus, a pattern recognition system which utilizes incoming analog signals directly without analog to digital conversion is highly desirable. Such a system has not been known heretofore in the art, however.

Additionally, it is highly desirable to utilize systems for pattern recognition that employ parallel processing of analog signals. Such systems also have not been known in the pattern recognition art. Thus, there is a continuing need for a computer system which utilizes analog signals and performs parallel processing. This need requires an effective system to achieve fast, parallel processing of analog signals.

Apparatus have been developed which simulate or approximate certain aspects of the behavior of neural networks. An example of such a system is embodied in U.S. Pat. No. 4,773,024 to Faggin et al., which discloses a recognize-only embodiment of a recognition matrix having contacts comprised of a forward matrix and a reverse matrix. The contacts disclosed in Faggin et al. are permanently programmed by the user for a class of events and are therefore static. The user typically performs a learning function on a computer for all the events which the system will be programmed to recognize. The pattern of convergence responses and contact structure characteristics which cause convergence responses for the class of events as a whole are then examined and optimized for maximum recognition power and minimal confusion. This pattern of convergence responses is permanently programmed in the contacts of the program reverse matrices.

A similar system is disclosed in U.S. Pat. No. 4,774,667 to Buckley, wherein self-organizing circuits connected to receive a plurality of input signals representing constituent elements of input information are taught. The self-organizing circuits disclosed in Buckley are operable to effect identification of the pattern of constituent elements by combining the influence that each constituent element has on the pattern of constituent elements. A mechanism is provided to modify the influence which each constituent element has on the signal pattern of constituent elements based upon cumulative Boolean functions between the input signals to each circuit output. Furthermore, a mechanism connected to vary the influences based upon competition among the input signals is provided by Buckley in col. 6, line 9 through col. 9, line 2 thereof.

In addition, electronic circuits which mimic neural networks and associative memories are taught in U.S.

Pat. No. 4,660,166 to Hopfield, wherein the use of amplifiers connected to a matrix of input and output conductors to produce stored outputs in response to input signals is disclosed. Each connection is implemented with a network of resistors connected to the inputs and outputs in the amplifiers. The resistive values are selected to satisfy the circuit's "equation of motion." The network disclosed in the Hopfield patent is driven to a stable state at the complementary output of the amplifiers which provide an output code word that approximates the problem's solution as described in Hopfield, col. 6, line 10 through col. 10, line 7 thereof.

The aforementioned patents do not solve a long-felt need in the art for methods and apparatus which can drastically reduce the time required to achieve analog processing of data and pattern recognition. While the aforementioned patents provide a modicum of parallel processing, they generally either rely partially on standard digital computers for their data processing capabilities or do not themselves provide pattern recognition but merely pre-process analog data for ultimate conversion to digital signals and subsequent digital processing.

One of the inventors of the subject matter herein claimed and disclosed published a paper which theoretically defined neuron behavior and modelled artificial neurons comprising electronic components based on the input-output relationships of real brain neurons. See. P. Mueller, T. Martin and F. Putzrath, "General Principals of Operations in Neuron Nets with Application to Acoustical Pattern Recognition," reprinted in *Biological Prototypes and Synthetic Systems,* Vol. 1, p. 192-212 (1962). In the aforementioned paper, a neuron's behavior as a logic device was disclosed. As described therein, the neuron has both excitatory and inhibitory inputs and excitatory and inhibitory feedback which cause the neuron to fire when the combination of these inputs exceeds a threshold voltage. Because firing neurons can be observed without outputting a uniform voltage, Boolean algebra was disclosed to be useful as a tool for quantitative treatment of the relationship between the input and the output of the neuron. Additionally, examples of electronic neurons which simulate the behavior of brain neurons were described in this paper.

As noted in the above-mentioned paper, general electronic neurons may approximate the basic properties of biological neurons. One of inventors of the subject matter herein claimed and disclosed has also recognized that artificial neurons so constructed would be particularly useful in artificial neural networks for speech recognition. See P. Mueller, "Principles of Temporal Pattern Recognition in Artificial Neuron Nets with Application in Speech Recognition," reprinted in *Artificial Intelligence. IEEE,* pp. 138-44 (1963).

While the general properties of artificial neurons modelled after brain neurons has thus been known in the art at least since the early 1960s, there remains a long-felt need in the art for artificial neural networks which function as general purpose neural computers. None of the aforementioned patents or papers disclose systems which solve a long-felt need in the art for electronic artificial neural networks that process data in analog form, thereby providing pattern recognition and general purpose neural computing.

SUMMARY OF THE INVENTION

General purpose analog computers comprising artificial neural networks provided in accordance with the present invention solve a long-felt need in the art for analog processing of data. This analog processing of data is much more rapid and efficient than the standard digital serial processing of data which has heretofore been used and eliminates the need to digitize analog signals before processing. General purpose analog computers claimed and disclosed herein also enjoy the advantage of being programmable and are thus self-modifiable to perform a variety of analog computational tasks. Furthermore, the analog circuits described herein are preferably modular and therefore neural computers which utilize them are arbitrarily expandable to be made as powerful as necessary for a given computational task.

In accordance with the present invention, analog neural modules which output analog signals in response to at least one analog input signal comprise a plurality of artificial neural elements wherein each of the neural elements outputs analog signals when analog input signals to the neural elements are above an input threshold, the neural elements having a minimum output threshold, a plurality of input lines connected to the plurality of artificial neural elements for interfacing the analog neural module with its environment, and analog multiplexing means interfaced with the plurality of neural elements for combining the analog output signals of the plurality of artificial neural elements.

Further in accordance with the present invention, methods of processing analog data are provided comprising the steps of inputting analog signals to an artificial neural network comprising a plurality of artificial neural elements, setting a synaptic memory with weights that scale analog outputs from the neural elements according to the weights, multiplexing the analog outputs from the neural elements to obtain a common analog output for the artificial neural network, switching the weighted analog outputs between at least one other subsequent artificial neural network, thereby changing connection architecture between the artificial neural networks each having a common analog output, and monitoring the common analog outputs from the artificial neural networks.

BRIEF DESCRIPTION OF THE DRAWINGS

FIG. 9A illustrates a simplified block diagram of a neural network provided in accordance with the present invention, while

DETAILED DESCRIPTION OF PREFERRED EMBODIMENTS

Figure 1:
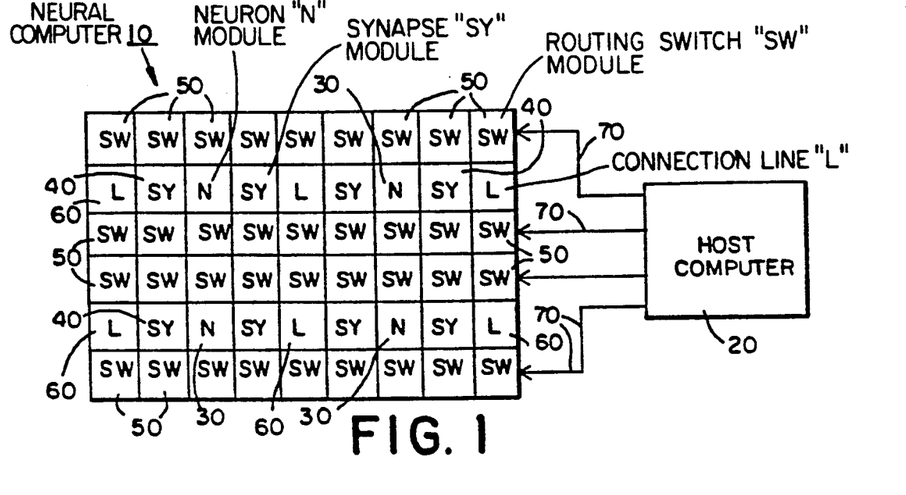
FIG. 1 is a block diagram of a general purpose neural computer provided in accordance with the present invention.

Referring now to the drawings wherein like reference numerals refer to like elements, FIG. 1 shows a general purpose neural computer at 10 provided in accordance with the present invention. Neural computers provided in accordance with the present invention are loosely based on the cerebral cortex in the sense that there are separate neurons, axons, and synapses so that each neuron receives only a limited number of inputs. With such artificial neural computers, as contrasted to biological systems, the connections can be modified by an external control permitting exploration of different architectures with the additional adjustment of synaptic weights and neuron parameters. In accordance with the invention, the modification of the synaptic weights is generally controlled by a host computer 20 which is preferably a standard digital electronic computer.

In preferred embodiments, the electronic neural computer 10 comprises a plurality of each of the following elements. Artificial neurons (hereinafter referred to as "neurons") denoted at "N" are shown generally at 30. Synapses "SY" shown generally at 40 are interfaced with the neurons and other elements. Additionally, routing switches "SW" shown at 50 and connection lines "L" shown generally at 60 are provided. Host computer 20 is interfaced to the neural computer 10 through a plurality of interface lines 70 interfaced with the switch elements.

Arrays of neurons 30, synapses 40, switches 50 and lines 60 may be fabricated on VLSI chips for mounting on a plane or chip carrier to form separate modules. Modules may then be interconnected to form large general purpose neural computers. Neuron arrays are arranged in rows and columns and are surrounded by the synaptic and axon arrays.

Neural computers provided in accordance with the present invention process analog signals for real-world, real-time computations such as analyses of visual or acoustical patterns, robotics, and for the development of special purpose neural nets. While the neural computer 10 can itself run in a completely analog mode, connection architecture, synaptic gains and time constants, as well as neuron parameters are set digitally by host computer 20. For the determination of synaptic gains and the implementation of learning algorithms, neuron outputs also may be multiplexed, analog to digitally converted, and stored in a digital memory in host computer 20. It is expected that even a moderately sized computer of $10^3$ to $10^5$ neurons will achieve computational speeds that will exceed any current digital electronic computer.

Figure 2A:
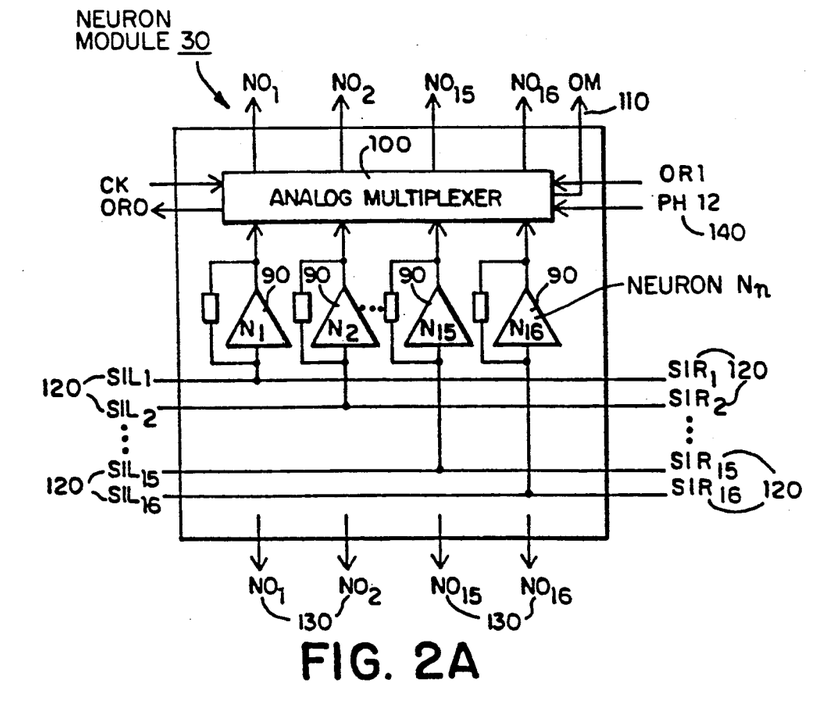
FIG. 2A is an analog neural module provided in accordance with the present invention.

FIG. 2A illustrates a neuron module 30 provided in accordance with the present invention. In preferred embodiments, the neuron module chip 30 contains neurons shown generally at 90. In yet further preferred embodiments and as an example of a neuron module 30 provided in accordance with the present invention, there are sixteen neurons 90 on neuron module (chip) 30. An analog multiplexer 100 is also provided which comprises a common output line 30 (OM) 110 which is connected to the host processor. The neuron module 30 has sixteen inputs $(SIL_1)$ shown generally at 120 both at the left and the right hand side in order to double the fan-in for the module. The input signals $SIL_i$ are provided by the neighboring synaptic modules in the memory module's environment and in the neuron module's environment as will be determined below.

Each neuron 90 has a second input that sets the minimum output at threshold for the neurons 90 and which is common for all neurons 90 on the same chip. Threshold is set from one of the synapses which is connected to a fixed voltage. There are sixteen output lines $(NO_j)$ shown generally at 130 at the top and bottom of neuron module 30 which come from the sixteen neurons 90.

In further preferred embodiments, analog multiplexer 100 consists of sixteen analog switches which connect the neuron 90 output sequentially to the common output line 110. This output is buffered in by the signal, OM, that is sent to an analog to digital converter over the common line. The output signals are stored in the memory of the host computer 20. The multiplexer switches are, addressed in series by complementary clock signals CK. In yet further preferred embodiments, the addressing circuit is a 16-bit chip register that shifts a "1" from the input to the output. The shift register (not shown) is clocked by two phase clocks which are generated on-chip from a master clock, CK, coming from the host computer 20. In still further preferred embodiments, clock CK runs at about 2 MHz.

After the last neuron 90 has been read, a pulse, ORO, is sent to the ORI input of the next neuron module 30. After this occurs, the module sends its sixteen analog neuron outputs $NO_i$ sequentially through output line OM and then sends an ORO pulse to the next chip in a row of neuron modules 30. Thus, all neurons 90 are read out in sequence. After all the neuron modules 30 have been read, the host computer 20 sends an ORI pulse to the first neuron, $N_1$, and the procedure repeats. In this fashion, all the neurons 90 on a board can be read out in a few milliseconds which is fast enough to record a series of snapshots of the state of the network.

Preferably, in order to synchronize the multiplexer 100 with the host computer 20 and the analog to digital converter, control line PHI2 shown, generally at 140 between the neuron module 30 and host computer 20 sends a synchronizing signal generated by the host computer 20 to the memory module. Control line PHI2 140 also provides a control signal from host computer 20 which enables and disables analog multiplexer 100 in order to allow neurons 90 to be read in sequential fashion.

Figure 2B:
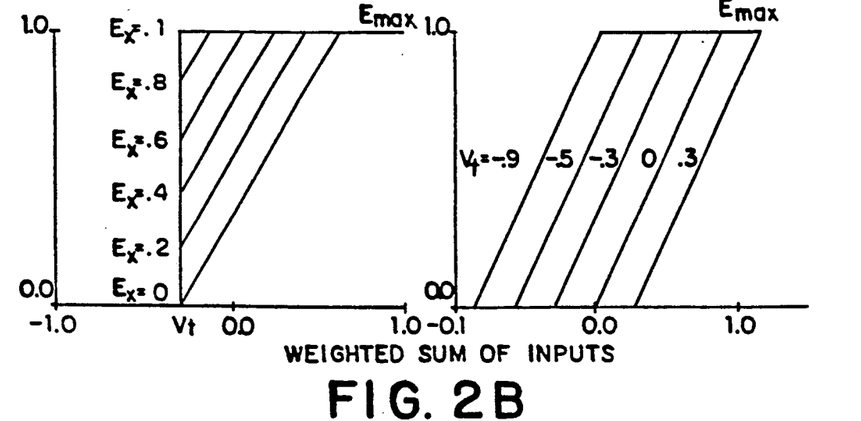
FIG. 2B illustrates graphs of the output of the analog neural modules of FIG. 2A against weighted inputs.

FIG. 2B illustrates the input and output relations of the neurons 90 as preferably idealized versions of typical biological neurons. The graphs in FIG. 2B illustrate the transfer function for each of the neurons 90. On the y axes, the output of the neurons $(E_o)$ are shown, while the x axes illustrate the weighted sum of the inputs to each of the individual neurons. The neurons have an adjustable threshold, $V_t$, a linear transfer region above the threshold, an adjustable minimum output at threshold $E_x$, and a maximum output, $E_{max}$. For a fixed $V_t$ and varying minimum outputs of threshold $E_x$ from 0 to 1, the output of the neurons are linear to $E_{max}$. Similarly, for varying $V_t$'s the outputs of the neurons are linear to $E_{max}$. The graphs of FIG. 2B illustrate the linear nature of the output of the neurons 90 provided in accordance with the present invention as having minimum outputs at adjustable thresholds.

Figure 3:
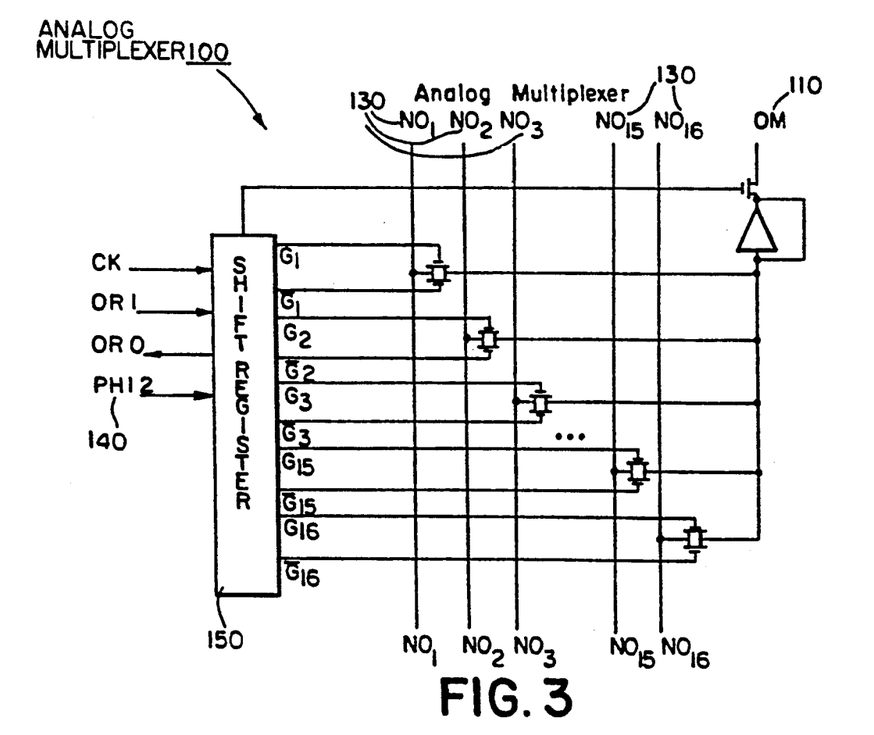
FIG. 3 is an analog multiplexer used for multiplexing data from neural elements.

FIG. 3 illustrates the basic architecture of the analog multiplexer 100. As shown, shift register 150 is interfaced with each of the output lines 130 and common line OM at 110. The CK (clock), PHI2 and OR1 signals are input to shift register 150 while the ORO signal is an output of shift register 150. Shift register 150 may comprise a standard shift register readily available in the industry and is preferably a 16-bit shift register.

Figure 4:
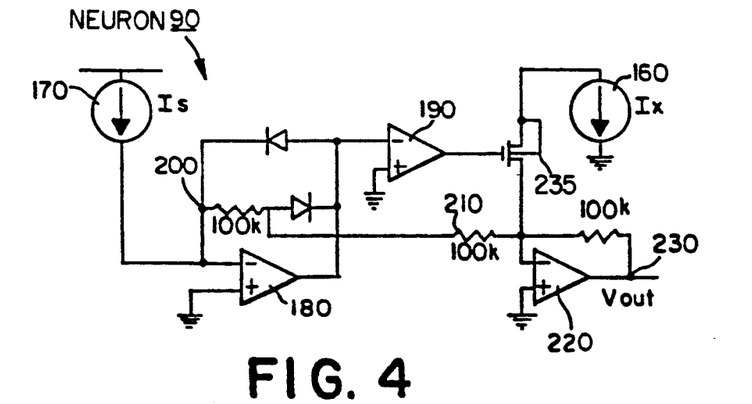
FIG. 4 is a preferred embodiment of a neural element having a minimum output at threshold.

FIG. 4 illustrates a neuron circuit 90 provided in accordance with the present invention. Neuron circuit has a linear transfer region above the threshold, an adjustable minimum output as described with respect to FIG. 2B, and a maximum output. While the circuit of FIG. 4 is exemplary, other circuits may be designed which could give similar parametric values. The minimum output at threshold is controlled by current source 160. Current I, shown at 170 provides an externally adjustable threshold in the memory while controlling the output of differential amplifier 180 and the output of differential amplifier 190, although the output of differential amplifier 190 is significantly different since there is a voltage drop across resistor 200 which forms an input signal to differential amplifier 190. A further voltage drop across resistor 210 controls the output to differential amplifier 220. The output for the neuron circuit 90 is shown generally at 230 and is preferably a continuous voltage output. However, the voltage output could be in the form of voltage spikes or pulses when desired for a particular application.

In preferred embodiments, neuron 90 may be fabricated on a CMOS semiconducting chip. In still further preferred embodiments, the operation of the neuron 90 is in the current summing mode, and the output 230 is from about 0 to 4 volts. Preferably, a linear transfer function as illustrated in FIG. 2B is obtained with synaptic memory provided in accordance with the present invention. However, it will be recognized by those with skill in the art that a sigmoidal transfer function may also be obtained. It is further preferable to keep the output impedance of the neuron circuit 90 to less than about 1 KOhm and having a gain bandwidth product of about 900 KHz. Furthermore, the threshold adjustment could be logarithmic, positive or negative with a 5-bit resolution, and the adjustment of the minimum output at threshold may be between 0 to 4 volts with a 5-bit resolution. Multiple inputs can be provided to neuron circuit 90, although only one input is illustrated in FIG. 4, since in general multiple fan-in inputs are contemplated for neurons 90 provided in accordance with the present invention.

The threshold of each neuron is individually adjustable from the synapse Sy through an extra synapse that is connected to a fixed input voltage. In this way the threshold can be biased in either direction. A neuron 90 with a negative threshold bias produces an output in the absence of input from the other neurons. This feature is often observed in biological neurons and is also important for learning by backpropogation.

In preferred embodiments, each neuron 90 has an adjustable minimum output at threshold, $E_x$, that can be set to any value between 0 and $E_{max}$ by application of a current to $E_x$ via a transistor shown generally at 235. In the limit, the neuron 90 functions either as a Boolean switch when $E_x = E_{max}$, or as a summing amplifier when $E_x$ is set to 0. Intermediate settings permit combined logic and arithmetic operations by the same unit. Similarly, this feature is also found in biological neurons which in many cases begin firing at a relatively high rate when the sum of inputs reaches the threshold.

In yet further preferred embodiments of neurons 90 provided in accordance with the present invention, the input-output transfer function as shown in FIG. 2A is linear between $E_x$ and $E_{max}$. This conforms roughly to the relation between the average membrane depolarization and firing rate of a typical biological neuron tested in isolation. Generally, the linearity of the input-output function is not critical, but linearity contributes to ease of programming and stable operations especially in the time domain.

While sigmoidal transfer functions may provide better results for simulating learning algorithms, a linear transfer function where $E_x$0 or $E_x>0$, will provide acceptable results provided that the derivative of the function was assumed to be that of a sigmoid. Sigmoidal transfer functions are also useful for, gradient descent learning since they enable the neurons 90 to perform multiplication and division of different inputs by biasing the operating region into the exponential or logarithmic portions of the sigmoid. As known by those with skill in the art, the sigmoidal transfer function can be obtained by adding one or more non-linear devices, for example, transistors, in parallel with the feedback resistor of a summing operational amplifier such as resistor 200 in FIG. 4.

The neurons 90 shown in FIG. 4 generally do not generate action potentials, but transmit their voltages as continuous variables. However, nerve fibers in the human body have extremely high impedances and reliable transmission is achieved by a pulse frequency modulation code wherein the output of a neuron 90 is transformed into an impulse frequency that is integrated by the synapse. There are, however, many examples such as in the retina, where outputs from short axon neurons are continuous potential changes. Except in cases where very precise temporal relations must be preserved, as for example in the computation of acoustic delays, an individual impulse has little significance, and thus the circuit of FIG. 4 provides adequate modelling of the action potential to achieve adequate pattern recognition.

When $E_x$ is set high, the neurons 90 described herein respond with phase-locked pulses to sinusoidal inputs and therefore may also be used for acoustical delay computations. Thus, the neurons illustrated in FIG. 4 and provided in accordance with the present invention provide accurate and repeatable pattern recognition for a large variety of patterns which will be input to the system.

Figure 5:
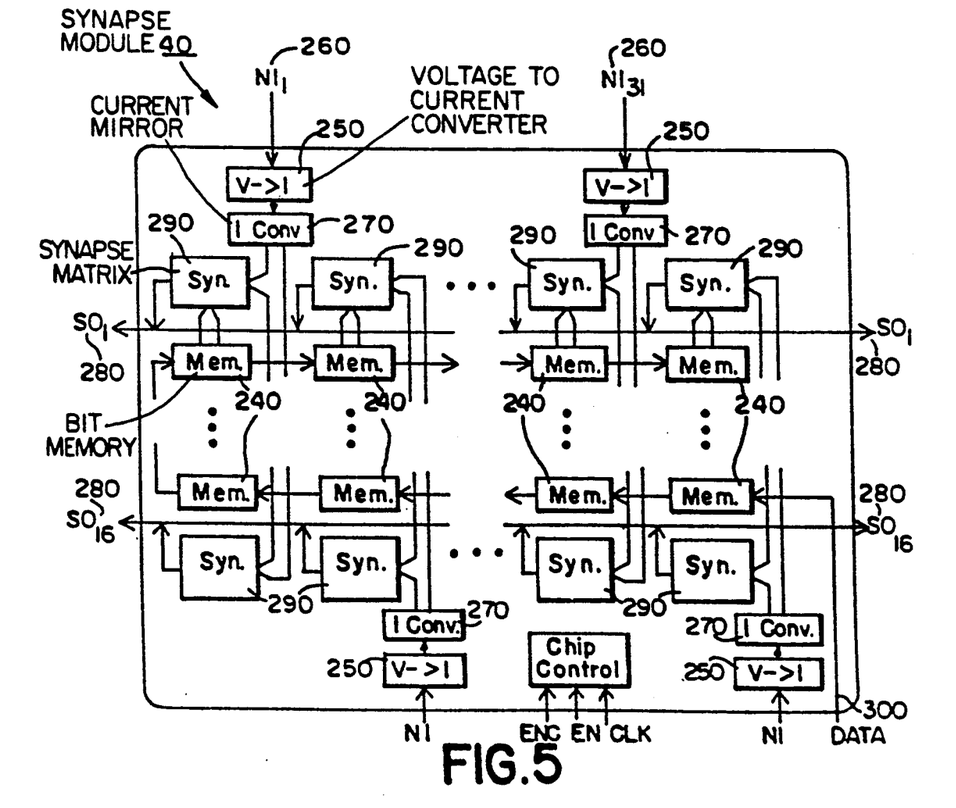
FIG. 5 is a synaptic module used in neural networks provided in accordance with the present invention.

Synapse chip 40 is illustrated in FIG. 5. The synaptic weight of each synapse may be set by a serial input from the host computer 20 and stored in the synapse in a bit local memory 240. In preferred embodiments, the bit local memory 240 is six bits in length and the dynamic range of the synapse gains extends from 0 to 10 with 5-bit resolution, wherein the sixth bit determines the sign of the gain. The gains are implemented by current mirrors that scale the neuron output after it has been converted from a voltage to a current.

Modifiable synapse designs are known in the art. See, for example, Raffel J. I., Mann, J. R. Berger, R., Soares, A. M., Gilbert, S. A., "A Generic Architecture for Wafer-Scale Neuromorphic Systems," *IEEE First International Conference on Neural Networks*, III-501, San Diego, Calif. (1987). Modifiable synapse designs generally use either analog or digital signals to set the gains. In preferred embodiments, digital signals to set the gains are implemented with neural networks provided in accordance with the present invention because of greater reproduceability and because direct analog setting of the gains from the neuron outputs require an a priori knowledge of a commitment to a particular learning algorithm.

Each of the synapse gains is set by a 5-bit words stored in the local memories 240. Memories 240 are implemented as quasi-dynamic shift registers that read the data from the digital host computer 20 during the programming phase in order to set the gains of the synapses. Voltage to current converters 250 transform neuron outputs, shown generally at 260, into currents. Current mirrors 270 scale the currents with a 5-bit resolution. Weighted currents are summed on common lines $SO_1$ shown generally at 280, to the neuron inputs.

In further preferred embodiments, each synapse chip 40 comprises 32×16 synapses with corresponding arrays of 6-bit memory elements, which are mapped onto the synapse matrices shown at 290. Thus, the chip 40 has 32 input lines $NI_j$ that come from neuron outputs routed over the switch modules. The inputs, which preferably vary between 0 and 4 volts, are transformed into currents as stated above. Only one voltage to current converter and current divider is needed per column, and associated with the converter is a current divider which generates required voltages to drive the synapses. Sixteen additional input lines may be provided in order to increase the fan-in for each neuron from 32 to 64 and up by placing one or more synaptic chips 40 adjacent to each other and connecting the outputs of one chip to the extended inputs of the other.

Voltage to current converters 250 take the neuron output voltages and generate currents proportional to those voltages. The circuit of FIG. 5 was derived from the design found in Bult, K. and Walinga, H., "A Class of Analog CMOS Circuits Based on the Square Law Characteristics of an MOS Transistor in Saturation," *IEEE J. Solid-State Circuits*, SC-22:3657 (1987).

The circuits of FIG. 5 having current mirrors 270 which generate currents that preferably decrease in a logarithmic fashion allow the selection of synaptic gains (weights) over a range of 0 to 10 with a 5-bit resolution. Synapses 290 comprise a series of current switches in series with a current source which comprises a steered current circuit using preferably PMOS transistors. A current switch steers the current to the neuron input line or to ground as controlled by synapse 290.

Current mirrors 270 invert the currents to implement excitatory or inhibitory connections to the neurons. In further preferred embodiments, the current sources in synapses 290 are realized by transistors whose gate and source terminals are connected to a current divider circuit in a current mirror configuration. By separating the current divider circuits from the synapse, sharing of divider circuits among all the synapses on the same column is accomplished. A current converter controlled by a sign bit allows implementation of excitatory and inhibitory connections without doubling the number of inputs. The switches that select the current levels and determine the synaptic weights are driven by the outputs of memory elements 240.

In further preferred embodiments, memory elements 240 may consist of cross-coupled inverters which are connected in series to form one large shift register. This allows the use of the same inverters to read the data serially in all memory elements by using a two-phase clocking scheme. Data for the two-phase clocking scheme may be provided by the digital host computer 20 over one line labelled "data" shown generally at 300.

Figure 6A:
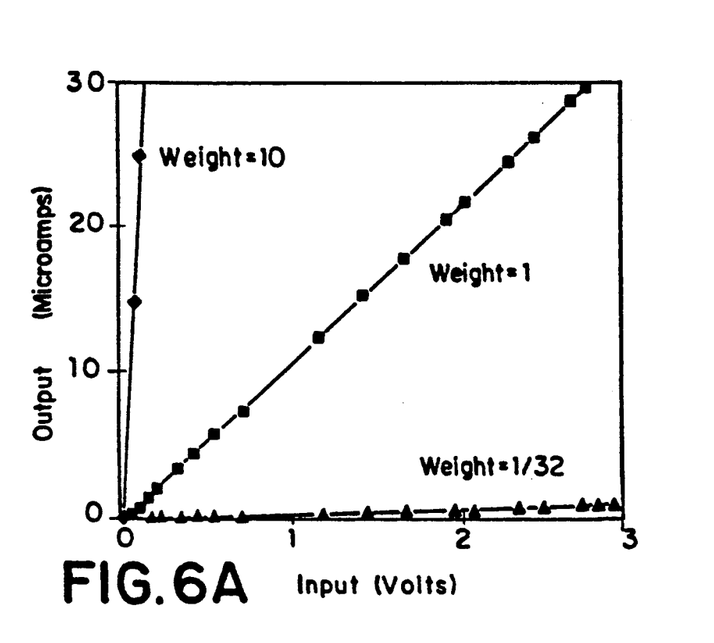
FIGS. 6A and 6B are graphs illustrating the linear output of synaptic weights as a function of input voltage.

FIG. 6A illustrates a graph of synaptic transfer functions. The linear nature of the synaptic transfer function occurs with synaptic weightings from 1/32 to 10. Furthermore, the synaptic transfer function is linear from 0 to 4 volts.

Figure 6B:
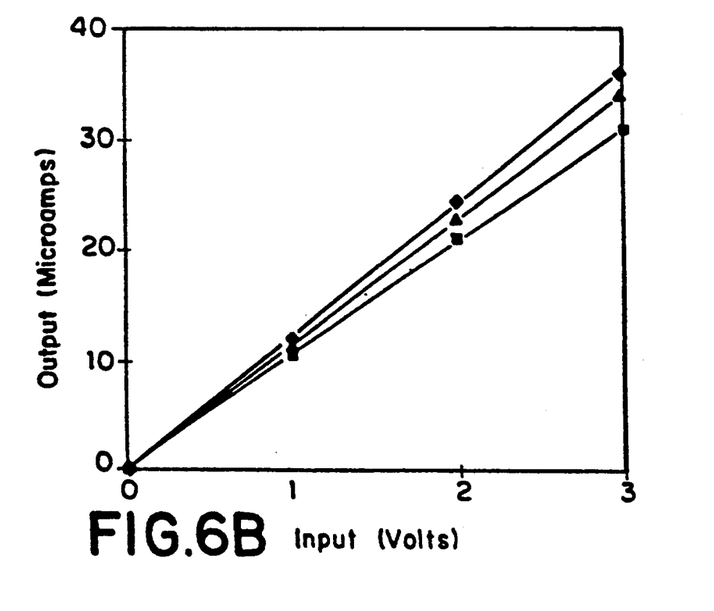

FIG. 6B illustrates transfer characteristics for synaptic modules modeled in accordance with the present invention and show that the transfer characteristics remain linear. The use of current mirrors permits arbitrary scaling of the synaptic gains (weights) with trade-off between range and resolution limited to five bits in preferred embodiments. In still further preferred embodiments, a minimum gain of 1/64 and a maximum of 10 is provided. The lower end of the dynamic range is determined by the number of possible inputs per neuron which when active should not drive the neuron output to its limit, whereas the high gain values are needed in situations where a single or only a few synapses must be effective such as in a copying action from one neuron to another.

Figure 7:
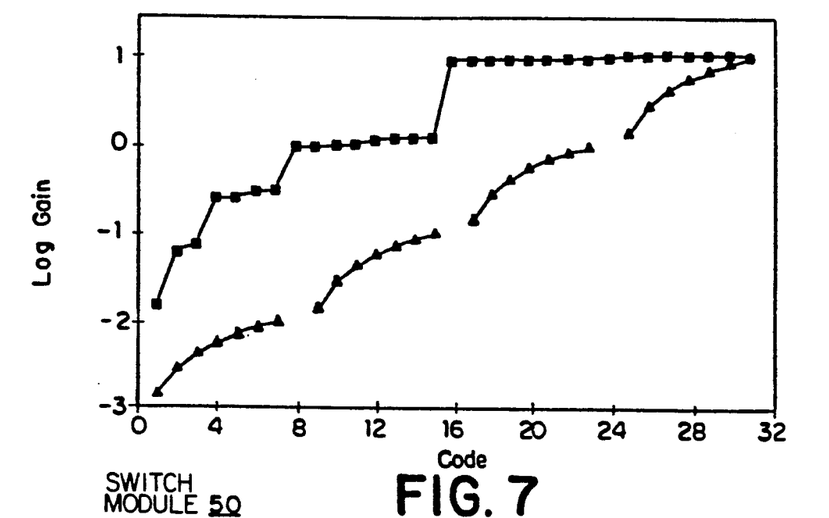
FIG. 7 illustrates a digitized synaptic transfer function.

FIG. 7 illustrates an approximation of a logarithmic scale using a digital code. The triangular graphs show that the total gain is the sum of five individual gains, each controlled by one bit. This leads inevitably to jumps in the gain curve. In the second case, shown by the square curve, a linear 3-bit gain is multiplied by four different constants controlled by the fourth and fifth bit. This "floating point" scheme provides better approximation to a logarithmic scale.

Although the resolution of an individual synapse is limited to five bits in preferred embodiments, several synapses driven by one neuron can be combined through switching, permitting greater resolution and dynamic range. Furthermore, mismatching of synaptic currents due to transistor differences can be compensated by this method.

In preferred embodiments, synaptic modules 40 are fabricated on CMOS or bi-CMOS integrated circuits and perform current scaling. The weight control is preferably digital having a 6-bit resolution with a dynamic range of weights or gains between 0 and 10. An output current range through the synaptic modules is preferably between 0 to 400 µA, with transfer characteristics being linear from 0 to 4 volts. Furthermore, the input impedance of the chips is greater than $10^{12}$ Ohms.

The switch modules 50 provided in accordance with the present invention serve to route signals between neuron modules 30 and synapse modules 40, thereby changing the connection architecture. Similar routing schemes have been employed for programmable interconnections in subcircuits between VLSI chips. See, for example, Sivilotti, M., "A Dynamically Configurable Architecture for Prototyping Analog Circuits," *Advanced Research in VLSI, Proc. of the Fifth MIT Conference*, Allen and Leighton eds., MIT Press, Cambridge, Mass. (1988).

Figure 8:
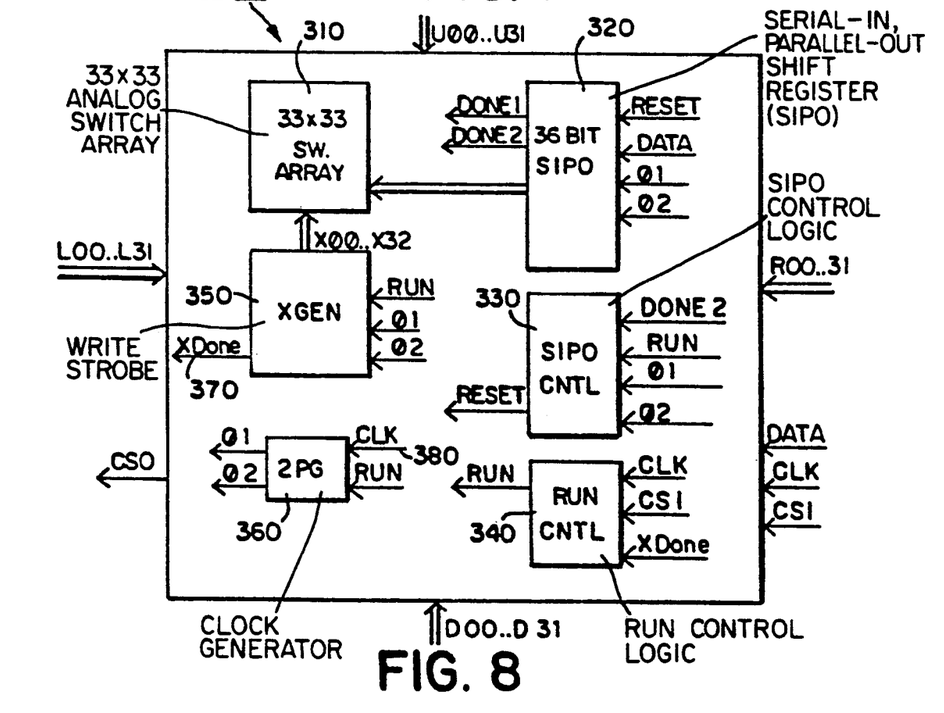
FIG. 8 is a switching module used in neural networks provided in accordance with the present invention.

FIG. 8 illustrates a block diagram of a switching module 50 which in preferred embodiments contains a 33 ×33 crosspoint array of analog switches shown generally at 310. The 33×33 crosspoint array of analog switches are set by a serial digital input. The switching module 50 further comprises a number of serial-in, parallel-out shift registers (SIPO) 320, SIPO control logic 330, run control logic 340, a write strobe 350, and a gated two-phase clock generator 360.

Data is downloaded serially from the host computer 20 to SIPO 320 and SIPO control 330. The SIPO blocks 320 and 330 parallelize the data and transfer it to the switch array 310 under control of the write strobe generator 350. The switching fabric of switch array 310 preferably comprise 1-bit switch control memories and analog switches coupled together. As known by those with skill in the art, control data can connect an arbitrary horizontal line to a vertical line by writing a "1" to the appropriate memory cell on the switch fabric. Switches in the switch fabric are generally placed in series with horizontal signals which allow the host processor to input a horizontal or vertical trace in the switch chip 310. Thus, interconnection busses may be partitioned into several segments which increase the maximum number of obtainable connections.

In preferred embodiments each switching cell in the switching fabric 310 is implemented as a CMOS transmission gate connected to one bit of memory. A control logic subsystem enables chip load circuits where the input is active, disables the chip load circuits when the loading is done, and propagates signals to the next switch chip. The signals U00 . . . U31 pass vertically through the chip to D00 . . . D31. Similarly, the signals L00 . . . L31 pass horizontally through the chip to R00 . . . R31.

Figure 11A:
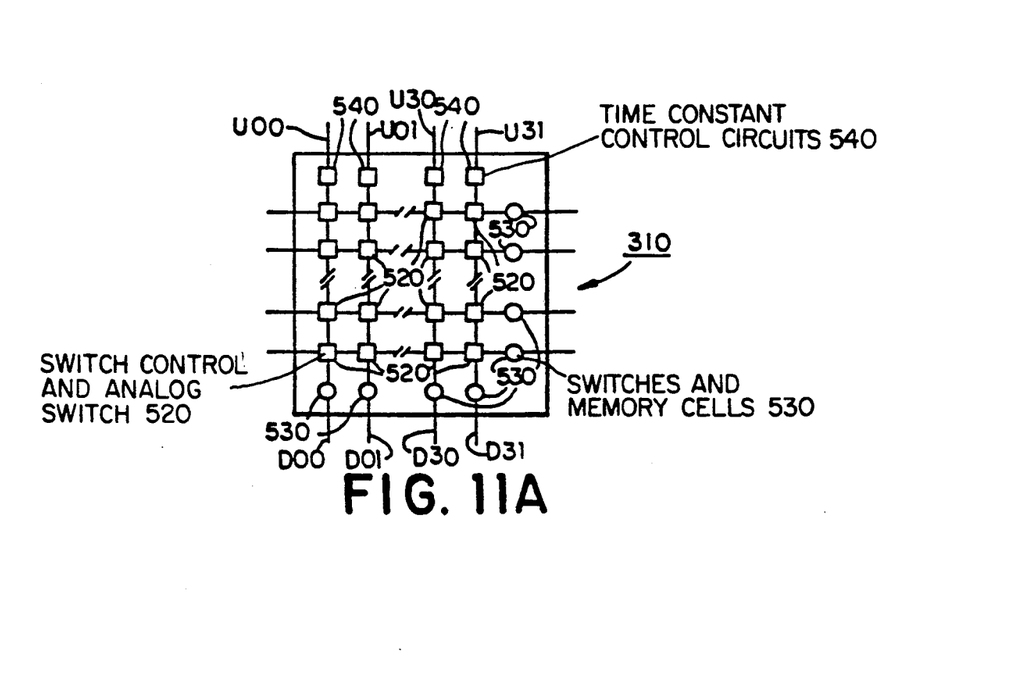
FIG. 11A illustrates a switching fabric for providing modifiable synaptic time constants in accordance with the present invention.

FIG. 11A illustrates a block diagram of switching fabric 310 in finer detail. Circuits 520 represent in preferred embodiments the aforementioned 1-bit switch control and analog switch. Control data connects an arbitrary horizontal line to a vertical line by writing a "one" into the appropriate memory cell. The circles 530 are also switches and memory cells. Switches in series with the horizontal or vertical signals allow the digital serial computer 20 to cut a horizontal or vertical trace in the switch chip. This allows interconnection busses to be partitioned to several segments which increases the maximum number of allowed connections. Additionally, switching fabric 310 contains circuits 540 which control the time constants, $\tau$, of the synapse transfer function.

For the analysis or generation of temporal patterns as they occur in motion or speech, for example, adjustable time constants of the synaptic transfer function must be provided to the general purpose analog computer of the invention. In preferred embodiments, circuits 540 provide low pass filtering of the input signal to the synapse with a 4-bit control of a time constant over a specified time range. In further preferred embodiments, this time ranges from 50 microseconds to 500 milliseconds or about 4 orders of magnitude. There are several ways to implement large and adjustable time constants to provide synaptic transfer function adjustability. One way is to charge or discharge a capacitor to a transconductance amplifier connected as a unity gain buffer. In this fashion a very low gain bandwidth (GBW) and slew rate low pass filter can be obtained. With this type of circuit, an input step may be applied to the amplifier so that the amplifier will first slew and then evolve exponentially towards its final value with a time constant proportional to the inverse of the GBW. By adjusting the bias currents of the amplifier one can, in effect, change the time constant of the circuit.

Another way to obtain low pass filtering adjustable synaptic transfer functions is based on translinear circuits. By biasing MOS transistors into weak inversion, the voltage current characteristics are exponentially similar to a bipolar transistor. This allows the use of flexible bipolar transistors to implement different functions.

Figure 11B:
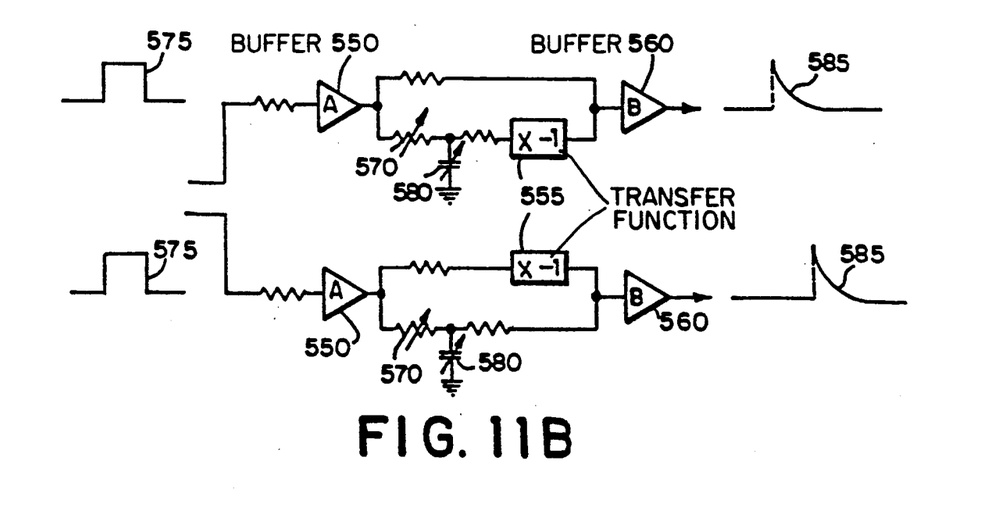
FIG. 11B illustrates a circuit for modifying the synaptic weights in a neural network in accordance with the invention.

By combining a low pass input with a direct input of opposite sign, both originating from the same neuron, typical "on" and "off" responses which serve as measures of time after the beginning and end of events and which are common in biological neurons can be obtained. Low pass circuits having this configuration are shown in FIG. 11B. In FIG. 11B, a block diagram of a circuit comprising neurons, synapses, and a low pass synaptic transfer functions to obtain on and off responses is shown. A transfer function is shown generally at 555 denoted by "X−1" for general shifting of data according to the desired application. The neurons are represented as input buffers A at 550 and output buffers B at 560.

The variable synaptic gains are implemented in preferred embodiments by a variable resistor 570 coupled to a variable capacitor 580 in a low pass filter configuration. The resistor capacitor and low pass filter combinations provide variable synaptic gains or "weights" for the circuit and may be programmably adjusted by the digital serial computer to effect the proper synaptic weights for the desired application. As an example of the input-output relationship, a squarewave input 575 is input to buffers 550 and the resulting exponentially decaying outputs 585 through buffers 560 is obtained. The shift in the exponentially decaying output from the lower buffer 560 as compared to the higher buffer 560 shows that the transfer function of the synapse 550 is on different legs of the circuit.

FIG. 8 illustrates SIPO, 320 which parallelizes serial data received from the host computer 20 to 33-bit words. Each SIPO bit drives one row of switch memories. Additionally, several SIPO taps may be used to generate the control signals. These control signals may then be used to detect when the first 33 bits of a cycle have been received from the host computer 20 to count the 36 clocks that comprise a cycle.

The write strobe generator circuit 350 maintains the address of the next column to receive SIPO data. After a 33-bit word has been assembled by the SIPO 320, the write strobe circuit 350 writes it to the proper column of switch memory 310 by asserting a control signal. In preferred embodiments, this function may be implemented by shifting a "1" into a 33-bit chip register. The output of the write strobe generator shown generally 370, may be generated after all 33 columns have been loaded.

Two-phase clock generator 360 produces a non-overlapping, two-phase clock. Furthermore, two-phase clock generator 360 includes logic which enables the clock only on the microprocessor's loading of the switch memory. This reduces the chip's power consumption. In preferred embodiments the clock signal 380 is a systemwide, 2 MHz, 50% duty cycle clock. During each 36 CLK cycles, 33 bits of switch control memory are loaded. In preferred embodiments the data provided by the host computer 20 during the last 3 CLKs of a cycle are not used. This allows the CPU to nibble-align the switch data in its local memory. The amount of memory used by the host computer 20 to maintain the image of the switch memory is $33 \times 36 = 1188$ bits. Thus, approximately 35 KBytes are necessary in a system consisting of 12 switch chips/row $\times$ 20 rows/card = 240 switch chips.

Figure 9A:
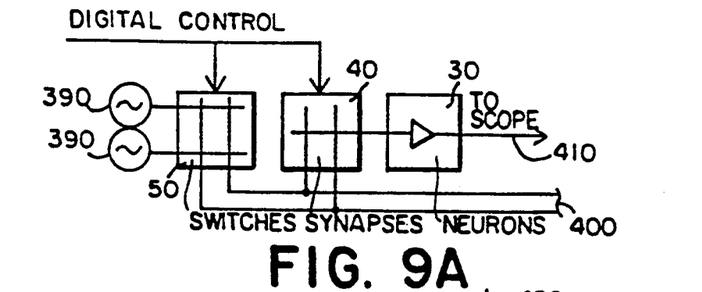

FIG. 9A illustrates a schematic of the interconnections between the neuron modules 30, synapse modules 40 and the switch modules 50. Input signals 390 are input to the switch modules 50. Outputs can be monitored directly from the switches at 400, or from the neuron modules 30 at 410. Switch 50 and synapse connections 40 may be controlled from the, host computer 20.

Figure 9B:
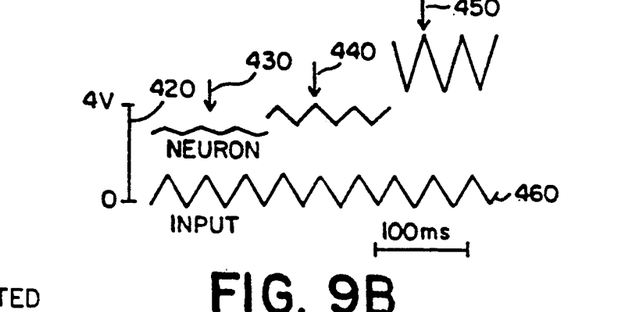
FIG. 9B illustrates the output of the neural network of FIG. 9A when a triangle wave is input.

FIG. 9B illustrates neuron output control through the adjustment of the synaptic gain. The synaptic gain was first set at 1/32 at 420. At arrow 430 the gain was switched to ⅛ while at arrow 440 the gain was switched to ½, and at arrow 450 the gain was switched to 1.8. The input was a triangle wave 460 and the output of the neuron between 0 and 4 volts varied according to the synaptic gains which were switched. Thus, the neural networks of FIG. 9A and FIG. 1 behave like a biological neural network given a triangle wave input.

The connections, synaptic gains, neuron parameters and time constants may be set from the host computer 20 either manually, or through implementation of learning algorithms that drive these parameters on the basis of neuron outputs. The connections are routed by graphic control routing routines as commonly used in circuit board design.

Neural networks provided in accordance with the present invention are particularly useful for feature-specific receptor fields, temporal pattern analysis, or circuits for motion control as in robotics. Input to a neural network provided in accordance with this invention can come from sensory transducer arrays such as an electronic retina, cochlea, or tactile sensors.

To determine transfer functions as a function of voltage, consider an N neuron system wherein each neuron receives M inputs. Each input may have an RC stage generating time constants arranged at 1 millisecond to 1 second in preferred embodiments, and a gain stage ($G_{ij}$), which establishes the input's weight. The weighted sum of neuron inputs is fed into an amplifier which may have a linear or sigmoidal transfer function. The network is then described with N x M differential equations which yield the voltages on the capacitors as a function of time and the neuron outputs.

Figure 10:
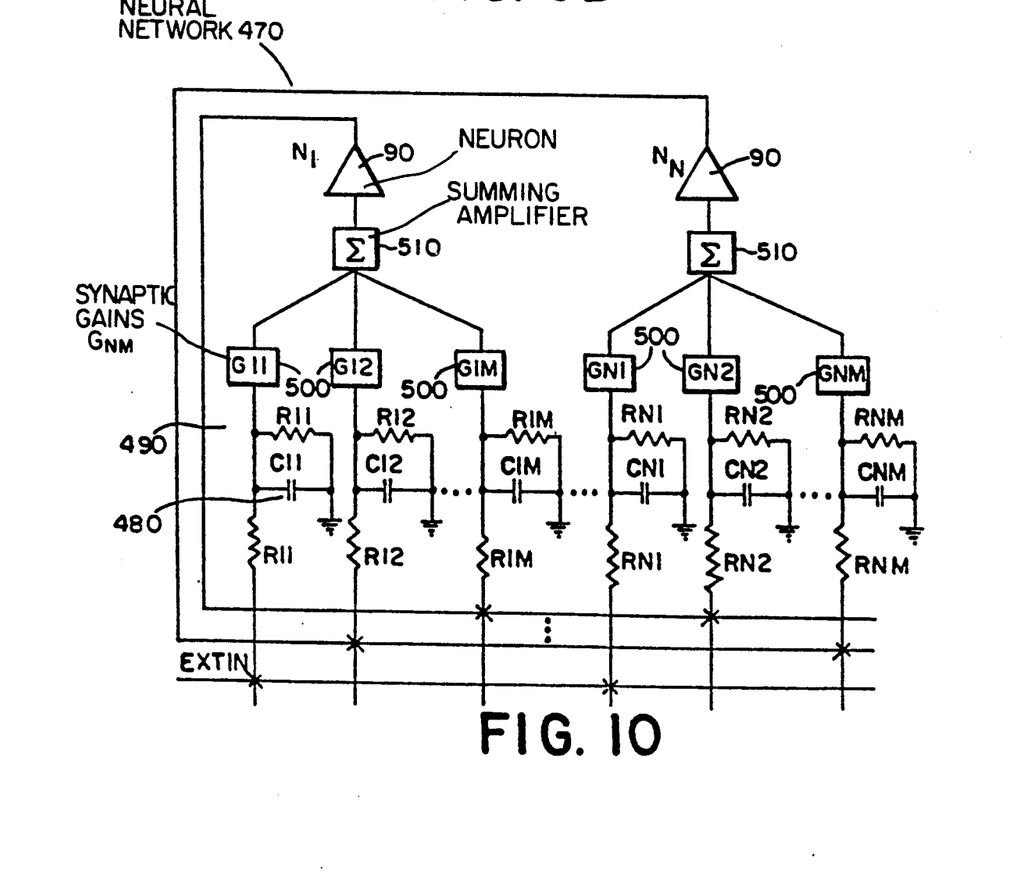
FIG. 10 is an electrical circuit diagram illustrating another embodiment of a neural module provided in accordance with the present invention.

FIG. 10 illustrates an electrical model of a simulated neural network 470. Low pass filters, are comprised of capacitors 480 and resistors 490, while the synaptic gains are shown generally at 500. Summing amplifiers 510 sum the outputs from the low pass filters.

The voltage on the $j_{th}$ capacitor of the $i_{th}$ neuron, $V_{ij}$, is given by:

$$dV_{ij}/dt = -V_{ij}/C_{ij} \times (1/R_{ij} + 1/R'_{ij}) + N_x/C_{ij} \times R_{ij}$$

where $N_x$ is the voltage from the neuron driving the input. The output of the $j_{th}$ neuron is thus given by:

$$N_j = S\left(\sum_{i=1}^{M} V_{ij} \times G_{ij}\right)$$

where $S(x) = 1/(1+\exp(-x))$.

Utilizing the above voltage models for the simulated neural network at FIG. 10 wherein the gains are uniformly distributed while the interconnections are randomly selected, the host processor 20 is able to rapidly and efficiently solve variously sized networks with randomly selected time constants. This result has not heretofore been achieved in the art, and thus methods and apparatus provided in accordance with the present invention solve a long-felt need in the art for general purpose analog neural computers.

There have thus been described certain preferred embodiments of general purpose analog computers provided in accordance with the, present invention. While preferred embodiments have been described herein, it will be recognized by those with skill in the art that modifications are within the true spirit and scope of the invention. The appended claims are intended to cover all such modifications.

What is claimed is:

1. A general purpose neural computer comprising:
   electronic neuron modules for outputting an analog output signal in accordance with at least one analog input value received on respective inputs thereof;
   modifiable synapse modules interconnected via interconnections with said electronic neuron modules for modifying synaptic weights of said at least one analog input value in accordance with first configuration signals;
   switching modules for routing second configuration signals between each respective electronic neuron module and synapse module so as to change said interconnections between said electronic neuron modules and synapse modules; and
   a processor for providing said first configuration signals to said synapse modules for modifying synaptic weights associated with said synapse modules and said second configuration signals to said switching modules for reconnecting said electronic neuron modules and synapse modules in accordance with a desired neural computing architecture.

2. A neural computer as claimed in claim 1, wherein each electronic neuron module comprises an output line for outputting said analog output signal, electronic neurons for outputting an analog signal of at least a minimum level when an analog input signal thereto is above a predetermined input threshold, and an analog multiplexer responsive to output analog signals output by each of said electronic neurons for sequentially connecting said output analog signals to said output line.

3. A neural computer as in claim 2, wherein said analog multiplexer comprises a shift register for sequentially shifting said output analog signals to said output line.

4. A neural computer as in claim 2, wherein each of said electronic neurons comprises a first current source for controlling said minimum level at said predetermined input threshold, differential amplifying means responsive to said first current source for varying said predetermined input threshold, and a second current source responsive to said differential amplifying means for establishing an externally adjustable threshold bias.

5. A neural computer as in claim 1, wherein each modifiable synapse module comprises a plurality of synapses and means associated with each of said synapses for storing said first configuration signals from said processing means as synaptic weights associated with each corresponding synapse.

6. A neural computer as in claim 5, wherein each of said switching modules comprises an array of analog switches for connecting each respective electronic neuron module to said synapse modules as specified by said second configuration signals and means for controlling time constants of transfer functions of said synapses.

7. A neural computer as in claim 6, wherein said time constants controlling means comprises a plurality of low pass filters for low pass filtering a transfer function of an associated synapse, each low pass filter having an adjustable resistance and capacitance.

8. A general purpose neural computer comprising:

electronic neurons for outputting an analog output signal in accordance with at least one analog input value received on respective inputs thereof;

modifiable synapses responsive to respective outputs of said electronic neurons for modifying synaptic weights of said at least one analog input value in accordance with input configuration signals;

adjustable low pass filters having a variable capacitor and a variable resistor for low pass filtering a transfer function of an associated synapse so as to control time constants of said associated synapse;

a processor for providing said configuration signals to said synapses for modifying synaptic weights associated with said synapses and to said low pass filters for modifying values of said variable capacitor and resistor so as to vary said time constants of said associated synapse; and summing amplifiers for summing outputs of said low pass filters and providing a sum value to respective ones of said electronic neurons as said at least one analog input value.

* * * * *

UNITED STATES PATENT AND TRADEMARK OFFICE
CERTIFICATE OF CORRECTION

PATENT NO. : 5,155,802
DATED : October 13, 1992
INVENTOR(S) : Mueller et al.

It is certified that error appears in the above-identified patent and that said Letters Patent is hereby corrected as shown below:

Column 2, Line 2, after "function" change "," to --.-- and change "also" to --Also--.

Column 3, Line 11, after "in" delete "Hopfield,".

Column 6, Line 5, after "inputs" change "($SIL_1$)" to --($SIL_i$)--.

Column 6, Line 10, change "determined" to --described--.

Column 7, Line 13, after "circuit" add --90--.

Column 7, Line 20, after "Current" change "I," to --$I_s$--.

Column 7, Line 55, after "synapse" (first occurrence) change "Sy" to --SY--.

Column 8, Line 17, after "where" change "$E_x0$" to --$E_x=0$--.

Column 8, Line 20, after "for" delete ",".

Column 9, Line 10, after "by" delete "a".

Column 9, Line 19, change "$SO_1$" to --$SO_i$--.

Column 12, Line 25, after "computer" add --20--.

Column 12, Line 34, after "SIPO" delete ",".

Column 13, Line 7, after "the" delete ",".

Column 13, Line 62, before "." add --)--.

Column 14, Line 7, after "the" delete ",".

UNITED STATES PATENT AND TRADEMARK OFFICE
CERTIFICATE OF CORRECTION

PATENT NO. : 5,155,802
DATED : October 13, 1992
INVENTOR(S) : Paul H. Mueller, et al.

It is certified that error appears in the above-indentified patent and that said Letters Patent is hereby corrected as shown below:

Abstract, line 13, "confirurations" to --configurations--.

Signed and Sealed this

Thirtieth Day of November, 1993

Attest:

BRUCE LEHMAN

Attesting Officer

Commissioner of Patents and Trademarks